US012783099B2

(12) United States Patent
Agura et al.

(10) Patent No.: US 12,783,099 B2
(45) Date of Patent: Nov. 3, 2026

(54) ELECTRONIC DEVICE OPERATED IN ACCORDANCE WITH CAPTURED IMAGE DATA OF HAND

(71) Applicant: SOFTBANK CORP., Tokyo (JP)

(72) Inventors: Katsuhide Agura, Tokyo (JP); Takuya Sakaguchi, Tokyo (JP); Nobuyuki Oka, Tokyo (JP); Takeshi Fukuizumi, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 234 days.

(21) Appl. No.: 17/764,151

(22) PCT Filed: Aug. 30, 2021

(86) PCT No.: PCT/JP2021/031679

§ 371 (c)(1),
(2) Date: Mar. 25, 2022

(87) PCT Pub. No.: WO2023/031988

PCT Pub. Date: Mar. 9, 2023

(65) Prior Publication Data

US 2023/0061557 A1 Mar. 2, 2023

(51) Int. Cl.

| | |
|---|---|
| ***G06F 3/04817*** | (2022.01) |
| ***G06F 3/01*** | (2006.01) |
| ***G06F 3/04812*** | (2022.01) |
| ***G06V 40/10*** | (2022.01) |

(52) U.S. Cl.

CPC .......... *G06F 3/04812* (2013.01); *G06F 3/017* (2013.01); *G06V 40/11* (2022.01); *G06V 2201/033* (2022.01)

(58) Field of Classification Search

CPC ..... G06F 3/017; G06F 3/04812; G06V 40/11; G06V 2201/033

See application file for complete search history.

(56) References Cited

U.S. PATENT DOCUMENTS

| | | | | |
|---|---|---|---|---|
| 8,994,718 | B2 * | 3/2015 | Latta | G06F 3/0485 345/419 |
| 10,296,102 | B1 * | 5/2019 | Misra | G06T 7/215 |
| 11,263,409 | B2 * | 3/2022 | Zhang | G06V 40/113 |

(Continued)

FOREIGN PATENT DOCUMENTS

| | | |
|---|---|---|
| EP | 0 571 702 A2 | 12/1993 |
| EP | 0829799 A2 | 3/1998 |

(Continued)

OTHER PUBLICATIONS

Request for the Submission of an Opinion dated Dec. 20, 2023, directed to Korean Application No. 10-2022-7009845; 11 pages.

(Continued)

*Primary Examiner* — Patrick F Riegler

(74) *Attorney, Agent, or Firm* — Morrison & Foerster LLP

(57) ABSTRACT

An electronic device may include: an acquisition section configured to acquire captured image data of a hand of an operator; a presumption section configured to presume, in accordance with the captured image data, skeleton data corresponding to the hand; and a determination section configured to determine, in accordance with the skeleton data, a cursor position for operating the electronic device.

12 Claims, 13 Drawing Sheets

(56) References Cited

U.S. PATENT DOCUMENTS

| | | | | |
|---|---|---|---|---|
| 2009/0110292 | A1* | 4/2009 | Fujimura | G06F 3/017 382/203 |
| 2009/0158203 | A1* | 6/2009 | Kerr | G06F 3/017 715/784 |
| 2009/0315740 | A1* | 12/2009 | Hildreth | G06F 3/017 341/20 |
| 2010/0166258 | A1* | 7/2010 | Chai | G06V 40/113 382/103 |
| 2010/0199191 | A1 | 8/2010 | Takahashi | |
| 2011/0018804 | A1* | 1/2011 | Homma | G06F 3/04812 345/158 |
| 2012/0050162 | A1* | 3/2012 | Kakuta | G06F 3/012 345/158 |
| 2012/0093360 | A1* | 4/2012 | Subramanian | G06V 10/143 382/103 |
| 2012/0309532 | A1* | 12/2012 | Ambrus | G06T 11/20 463/36 |
| 2013/0044053 | A1* | 2/2013 | Galor | G06F 3/017 345/158 |
| 2013/0057469 | A1* | 3/2013 | Ajika | G06T 7/73 345/156 |
| 2014/0337786 | A1* | 11/2014 | Luo | G06F 3/0425 715/773 |
| 2015/0169073 | A1 | 6/2015 | Isayama | |
| 2015/0193124 | A1* | 7/2015 | Schwesinger | G06F 3/04812 715/863 |
| 2015/0234460 | A1 | 8/2015 | Irie et al. | |
| 2015/0253864 | A1* | 9/2015 | Parkhomenko | G06V 40/28 345/156 |
| 2015/0261303 | A1 | 9/2015 | Tanaka et al. | |
| 2015/0261409 | A1 | 9/2015 | Tanaka | |
| 2015/0262002 | A1 | 9/2015 | Matsunaga | |
| 2015/0269744 | A1* | 9/2015 | Mukherjee | G06V 40/23 382/103 |
| 2016/0004320 | A1 | 1/2016 | Lundberg et al. | |
| 2016/0054807 | A1* | 2/2016 | Flagg | A63F 13/2145 345/158 |
| 2016/0195940 | A1* | 7/2016 | Hall | G06F 3/048 345/158 |
| 2016/0378294 | A1* | 12/2016 | Wright | G06F 3/04815 715/851 |
| 2017/0017393 | A1* | 1/2017 | Luo | G06F 3/04812 |
| 2017/0031452 | A1* | 2/2017 | Isayama | G06F 3/0482 |
| 2017/0038846 | A1* | 2/2017 | Minnen | G06V 40/28 |
| 2017/0315667 | A1* | 11/2017 | Peuhkurinen | G06V 40/107 |
| 2018/0024641 | A1 | 1/2018 | Mao et al. | |
| 2018/0107108 | A1 | 4/2018 | Nakatani et al. | |
| 2019/0094981 | A1* | 3/2019 | Bradski | H04N 21/414 |
| 2020/0033937 | A1* | 1/2020 | Erivantcev | G06T 7/246 |
| 2020/0202121 | A1* | 6/2020 | Konin | G06F 3/0219 |
| 2020/0225758 | A1* | 7/2020 | Tang | G06F 3/012 |
| 2020/0250874 | A1* | 8/2020 | Assouline | G06N 3/08 |
| 2021/0026455 | A1* | 1/2021 | Dash | G06F 3/017 |
| 2021/0174519 | A1* | 6/2021 | Bazarevsky | G06T 7/75 |
| 2021/0279893 | A1* | 9/2021 | Iwanowski | G06V 10/143 |
| 2022/0214743 | A1* | 7/2022 | Dascola | G06F 3/0482 |
| 2022/0317776 | A1* | 10/2022 | Sundstrom | G06F 3/013 |
| 2023/0027320 | A1* | 1/2023 | Pathak | G16H 50/70 |

FOREIGN PATENT DOCUMENTS

| | | | |
|---|---|---|---|
| JP | H5-324181 | A | 12/1993 |
| JP | 11-327633 | A | 11/1999 |
| JP | 2010-181978 | A | 8/2010 |
| JP | 2013-171529 | A | 9/2013 |
| JP | 2017-199379 | A | 11/2017 |
| KR | 10-2015-0106824 | A | 9/2015 |
| KR | 10-2286018 | B1 | 8/2021 |
| WO | 2014/010670 | A1 | 1/2014 |
| WO | 2016/174915 | A1 | 11/2016 |
| WO | 2018/105512 | A1 | 6/2018 |

OTHER PUBLICATIONS

Notice of Final Rejection dated Oct. 4, 2024, directed to Korean Application No. 10-2022-7009845; 10 pages.
Written Decision on Dismissal of Amendment dated Oct. 4, 2024, directed to Korean Application No. 10-2022-7009845; 4 pages.

* cited by examiner

ELECTRONIC DEVICE OPERATED IN ACCORDANCE WITH CAPTURED IMAGE DATA OF HAND

CROSS-REFERENCE TO RELATED APPLICATIONS

This application is a U.S. national stage application under 35 U.S.C. § 371 of International Application No. PCT/JP2021/031679, filed Aug. 30, 2021.

FIELD OF THE DISCLOSURE

The present invention relates to an electronic device and a program.

BACKGROUND OF THE DISCLOSURE

An electronic device is conventionally operated by information from an external input device (e.g., a mouse), a touch pad, or a touch panel. That is, an operator of an electronic device operates the electronic device by moving and clicking a mouse or by moving a finger on a touch pad or a touch panel, with which the finger is in contact, so as to carry out a touch operation.

In recent years, electronic devices have been made smaller, and mobile tablet terminals and smartphones have been used by many people. A mobile electronic device such as a tablet terminal or a smartphone can be operated by an operator by moving a finger or another object or carrying out a touch operation while bringing the finger or the another object into contact with a surface of a touch panel.

As an attempt to reduce a burden on an operator, the following Patent Literature discloses a technique in which a camera is used to acquire a position of a finger of the right hand, an operation region is set in the air at or near the position of the finger so as to correspond to a screen of a mobile telephone, and by moving the finger in correspondence with a position of the finger of the operator in the operation region, a cursor on the screen is moved, or an icon is highlighted and specified.

Patent Literature 1

Japanese Patent Application Publication Tokukai No. 2013-171529

SUMMARY OF THE DISCLOSURE

A case where an operator carries out an operation during operation of an electronic device while bringing a finger or another object into contact with a surface of a display panel may cause hygienic concern. Specifically, a contact of a hand or a finger with an electronic device may cause a virus attached to a surface of the electronic device to be attached to the hand or the finger by the contact of the hand or the finger. This may consequently cause viral infection.

In an operation input device disclosed in the Patent Literature, cursor movement, for example, can be carried out in a non-contact manner by movement of the right hand in the air. However, eventually, the device cannot be operated unless an enter button is depressed with a finger of the left hand.

It is therefore difficult to use the technique disclosed in the above Patent Literature to prevent infection that is caused by a virus attached to a surface of an electronic device.

An electronic device in accordance with an aspect of the present invention includes: an acquisition section configured to acquire captured image data of a hand of an operator; a presumption section configured to presume, in accordance with the captured image data, skeleton data corresponding to the hand; and a determination section configured to determine, in accordance with the skeleton data, a cursor position for operating the electronic device.

An electronic device in accordance with another aspect of the present invention includes: an acquisition section configured to acquire captured image data of a hand of an operator; a presumption section configured to presume, in accordance with the captured image data, skeleton data corresponding to the hand; and an operation section configured to operate, in accordance with the skeleton data, an application that is executed by the electronic device.

A program in accordance with an aspect of the present invention causes at least one processor of an electronic device to carry out: an acquisition process for acquiring captured image data of a hand of an operator; a presumption process for presuming, in accordance with the captured image data, skeleton data corresponding to the hand; and a determination process for determining, in accordance with the skeleton data, a cursor position for operating the electronic device.

A program in accordance with another aspect of the present invention causes at least one processor of an electronic device to carry out: an acquisition process for acquiring captured image data of a hand of an operator; a presumption process for presuming, in accordance with the captured image data, skeleton data corresponding to the hand; and an operation process for operating, in accordance with the skeleton data, an application that is executed by the electronic device.

DETAILED DESCRIPTION OF THE DISCLOSURE

The following description will discuss several embodiments. An electronic device in accordance with each of the embodiments refers to any device to which electronics is applied. The electronic device is exemplified by but not limited to a smartphone, a tablet, personal computers (including a laptop computer and a desktop computer), a smart eyewear, and a head-mounted display.

Embodiment 1

Example Configuration

Figure 1:
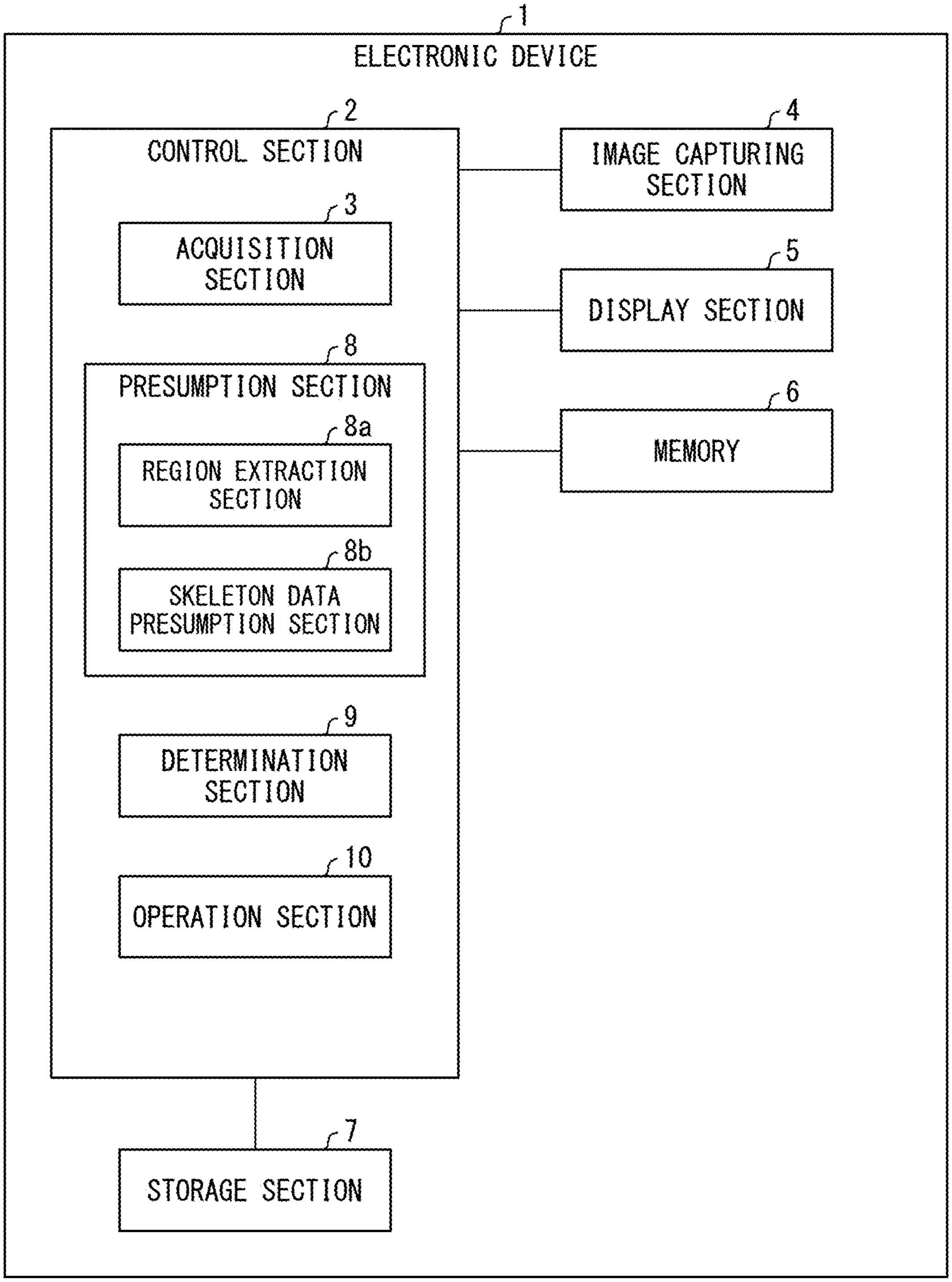
FIG. 1 is a block diagram showing an example of a configuration of an electronic device in accordance with Embodiment 1.

The following description will discuss an example configuration of Embodiment 1 with reference to the drawings. FIG. 1 is a block diagram showing an example of a configuration of an electronic device 1 in accordance with Embodiment 1. The following description will discuss, as an example, a case where the electronic device 1 is a smartphone. Note, however, that Embodiment 1 is not limited to this and can be applied to an electronic device in general. The electronic device 1 may be constituted by, for example, a control section 2, an image capturing section 4, a display section 5, a memory 6, and a storage section 7.

In Embodiment 1, the control section 2 may be constituted by a computing unit constituted by a semiconductor device, such as a microcomputer.

The image capturing section 4 may have a function of acquiring captured image data (including a still image and a moving image) of a hand of an operator (user). The image capturing section 4 is assumed to be a camera or a sensor included in the electronic device 1, but may alternatively be an external camera or an external sensor. The image capturing section 4 may be a depth camera capable of not only capturing an image (e.g., an RGB image) but also measuring a distance (depth) to an object. The distance can be measured by a publicly-known technique that is exemplified by a three-dimensional light detection and ranging (Lidar), and a triangulation method and a time of flight (TOF) method in each of which infrared light is used.

In an aspect, the image capturing section 4 may be a stereo camera including two or more image capturing sections. Captured image data acquired by the image capturing section 4 may include information indicative of the depth. Captured image data including information indicative of the depth may also be simply referred to as "captured image data". For example, captured image data may be an image having, as pixel values, values indicative of color and brightness (e.g., an RGB image), and may alternatively be an image having, as a pixel value, a value indicative of the depth (a depth image).

The memory 6 may be constituted by a memory of a microcomputer that is integrated with the control section 2. The memory 6 may be, for example, a RAM or ROM constituted by an independent semiconductor device that is connected to the control section 2. The memory 6 may temporarily store various programs executed by the control section 2 and various types of data referred to by those programs.

The storage section 7 may be constituted by a semiconductor device memory that is built in the electronic device 1 and that is a writable memory, such as a RAM or a flash memory. The storage section 7 may be alternatively constituted by an external memory that is connected to the electronic device 1. The storage section 7 may also store a learning model (described later).

The control section 2 may include an acquisition section 3, a presumption section 8, a determination section (detection section) 9, and an operation section (cursor display section) 10. The acquisition section 3 may have a function of acquiring captured image data of the hand of the operator from the camera 4.

The presumption section 8 may have a function of presuming, in accordance with the captured image data having been acquired by the acquisition section 3, skeleton data corresponding to the hand of the operator. The skeleton data is herein obtained by expressing, by a set of line segments (skeleton) serving as a framework of the object, a shape of an object having a volume. The skeleton data may be obtained by, for example, expressing each part of the object by a line segment indicative of an axis of the part or a line segment indicative of a frame of the part. The skeleton may differ from an actual framework of the object. For example, a skeleton of the hand does not necessarily need to extend along the bone of the hand, and only need to include line segments indicative of at least (i) a position of each finger and (ii) how each finger is bent. The skeleton data may alternatively be an aggregate of points called a skeleton mesh in which several representing points in the framework are sampled.

An algorithm by which the presumption section 8 is to presume, in accordance with the captured image data having been acquired by the acquisition section 3, the skeleton data corresponding to the hand of the operator is not particularly limited. However, for example, the presumption section 8 may presume the skeleton data corresponding to the hand of the operator with use of a learning model obtained through machine learning in which a set of (i) captured image data of many hands and (ii) skeleton data of the many hands is used as training data.

For example, the presumption section 8 may include a region extraction section **8*a* and a skeleton data presumption section 8*b***.

The region extraction section **8*a* may extract, in accordance with the captured image data, a region containing the hand. An algorithm by which the region extraction section 8*a* is to extract the region containing the hand is not particularly limited and may be a publicly-known algorithm. However, for example, by detecting a first or a palm in the captured image data, the region extraction section 8*a* may extract a region of the captured image data which region contains the hand. Note that the palm herein refers to a part of the hand except fingers. For example, the region extraction section 8*a* may detect the palm when the operator does not clench the hand, e.g., when the hand of the operator is open, and may detect the first when the operator clenches the hand. The region extraction section 8***a* may extract, in accordance with a position and a range of the detected first or palm, the region containing the hand of the operator.

The skeleton data presumption section 8*b* may presume, from the region having been extracted by the region extraction section 8*a* and containing the hand, the skeleton data corresponding to the hand. For example, the skeleton data presumption section 8*b* may use such a learning model as described earlier to presume the skeleton data corresponding to the hand.

As described above, by extracting the region containing the hand and then using the extracted region to presume the skeleton data, it is possible to improve a processing speed and a presumption accuracy.

The processing speed can be further improved in a case where the region extraction section 8*a* extracts, in accordance with a result of detection of the first or palm in the captured image data, the region containing the hand. That is, though the hand that is in an open state has a complicated shape and a processing time of a detection process is made longer, the processing time can be made shorter by detecting only the first and the palm each of which has a simple shape.

The determination section 9 may have a function of determining, in accordance with the skeleton data having been presumed by the presumption section 8, a cursor position for operating the electronic device 1. That is, the electronic device 1 may be an electronic device that can be operated by an input with coordinates, and the cursor position may be used to indicate the coordinates of the input. The determination section 9 may have a function of detecting, in accordance with the skeleton data having been presumed by the presumption section 8, an action (gesture) for operating the electronic device 1.

The operation section 10 may operate, in accordance with the cursor position having been determined by the determination section 9, an application that is executed by the electronic device 1. The operation section 10 may further operate, in accordance with the action (gesture) having been detected by the determination section 9, the application that is executed by the electronic device 1.

Example Appearance

Figure 2:
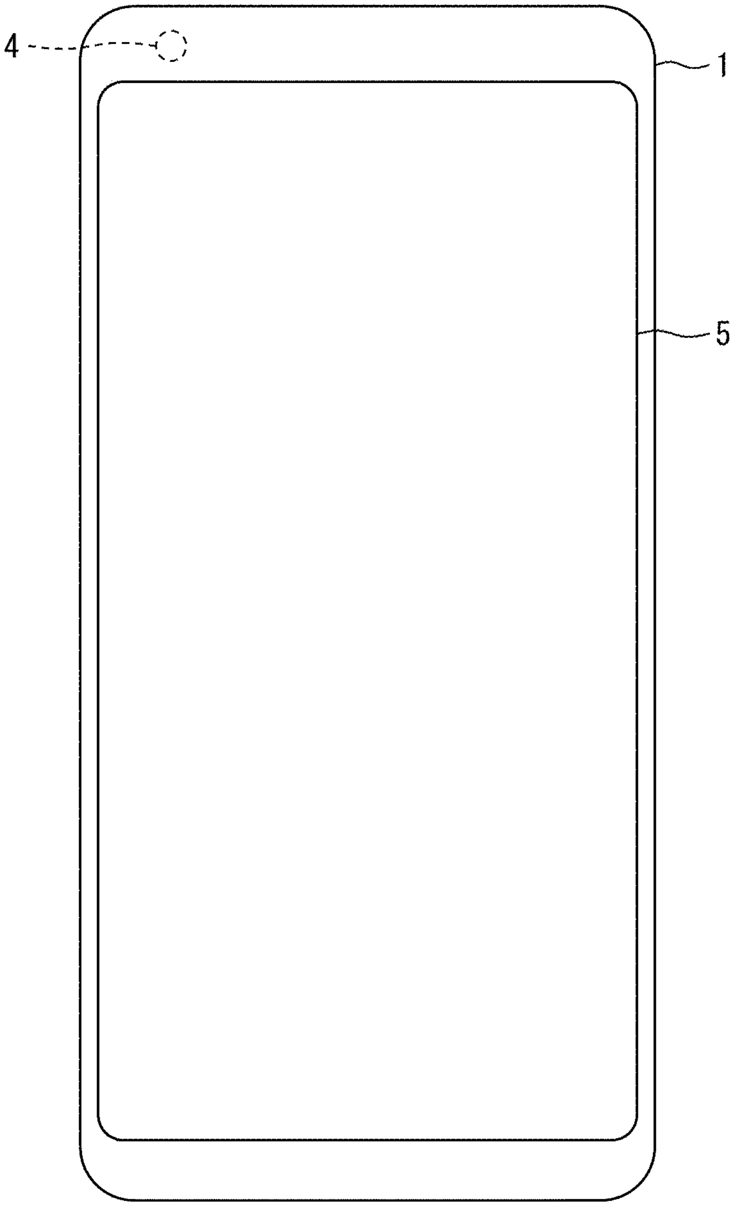
FIG. 2 is a view illustrating an appearance of a specific example configuration of the electronic device in Embodiment 1.

FIG. 2 is a view illustrating an appearance of a specific example configuration of the electronic device 1 in Embodiment 1. The image capturing section 4 may be a camera that photographs a front surface side of the electronic device 1 (in FIG. 2, a side on which the electronic device 1 is illustrated).

The electronic device 1 commonly also has a camera that photographs a back surface side (in FIG. 2, an opposite side from the side on which the electronic device 1 is illustrated), and this camera provided on the back surface side may be alternatively used as the image capturing section 4. However, in a case where the camera provided on the back surface side is used, the hand of the operator is blocked by the electronic device 1 and becomes difficult to see directly. Thus, the camera provided on the back surface side may be used in consideration of that point.

The electronic device 1 may have a display section 5 (display) on the front surface side. An image is displayed in the display section 5 of the electronic device 1, and the electronic device 1 may be configured to be capable of being operated by bringing a finger or another object into contact with the display section 5. Though not illustrated in FIG. 2, the electronic device 1 may have therein the control section 2, the memory 6, and the storage section 7.

Presumption of Skeleton Data

Figure 3:
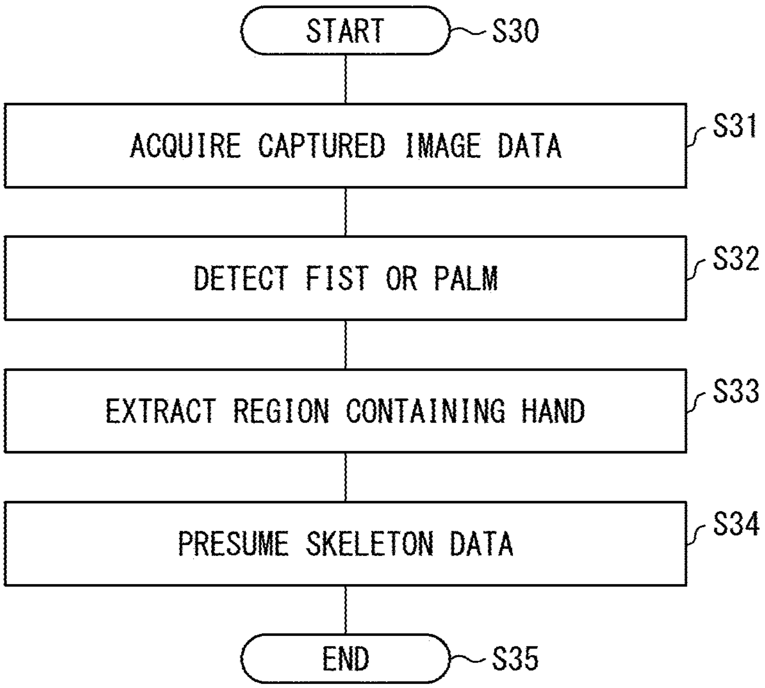
FIG. 3 is a flowchart describing an example of a flow of presumption of skeleton data in Embodiment 1.
Figure 4:
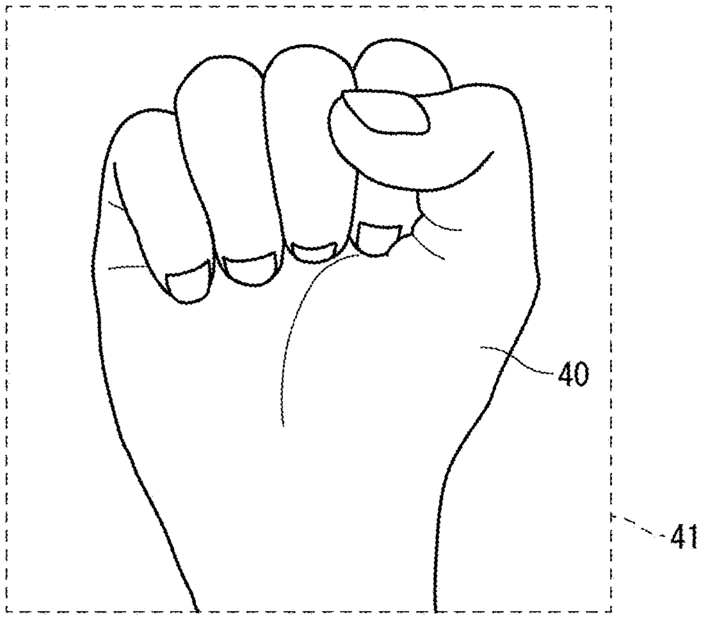
FIG. 4 is a view showing an example of image data of a fist.
Figure 5:
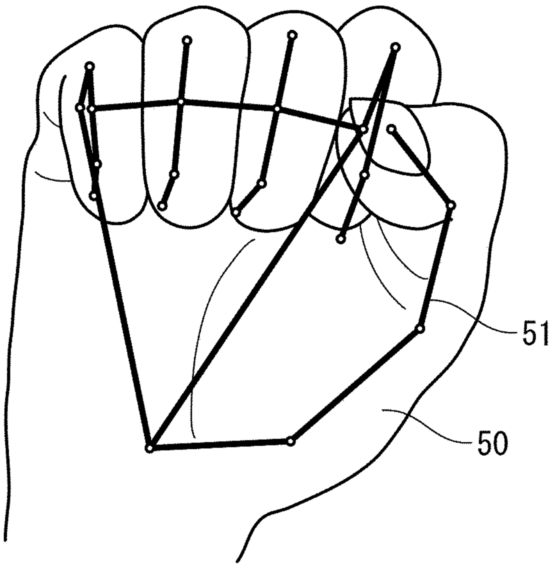
FIG. 5 shows an example of a view schematically illustrating a state in which a skeleton is superimposed on image data of a hand.

The following description will discuss a flow of presumption of the skeleton data in Embodiment 1 with reference to FIGS. 3 to 5. FIG. 3 is a flowchart describing an example of the flow of presumption of the skeleton data in Embodiment 1.

When the process is started (a step S30), the acquisition section 3 may acquire the captured image data from the image capturing section 4 (a step S31). Next, the region extraction section 8*a* may detect the first or palm in the captured image data (a step S32). FIG. 4 is a view showing an example of image data of a first 40 included in the captured image data detected by the region extraction section 8*a* in the step S32. The image data of the first 40 which image data is detected by the region extraction section 8*a* may vary from person to person. The right hand or left hand may be selectively indicated depending on a dominant hand of the operator. FIG. 4 illustrates a case where the dominant hand of the operator is the right hand. However, in a case where the dominant hand of the operator is the left hand, image data of the first of the left hand may be acquired.

An algorithm by which the region extraction section 8*a* is to detect the first or palm is not particularly limited and may be a publicly-known object recognition algorithm. Note, however, that the first or palm may be detected with use of, for example, a learning model in which a set of (i) image data of the first or palm and (ii) a region of the hand corresponding to the first or palm is learned as training data.

Next, the region extraction section 8*a* may extract, in accordance with the first or palm having been detected in the captured image data, a region containing the hand corresponding to the first or palm (a step S33). For example, in a case where the region extraction section 8*a* detects the first or palm in the step S32 with use of the learning model in which a set of (i) image data of the first or palm and (ii) a region of the hand corresponding to the first or palm is learned as training data, the region extraction section 8*a* may extract, as a region 41 containing the hand corresponding to first or palm, a region of the hand which region serves as an output of the learning model. Besides, the region extraction section 8*a* may alternatively extract, in accordance with a position of the first or palm having been detected in the step S32, the region 41 containing the hand corresponding to the first or palm.

Note here that the first or palm hardly changes in shape no matter what shape the hand has (no matter how a finger(s) is/are moved). Thus, in a case where the region extraction section 8*a* extracts, in accordance with the first or palm, the region containing the hand, one or more regions of the hand can be quickly detected. This allows the skeleton data presumption section 8*b* to presume the skeleton data.

Next, the skeleton data presumption section 8*b* may presume the skeleton data from the region having been extracted by the region extraction section 8*a* and containing the hand (a step S34). For example, the skeleton data presumption section 8*b* may presume, from the region having been extracted by the region extraction section 8*a* and containing the hand, the skeleton data corresponding to the hand of the operator with use of the learning model obtained through machine learning in which a set of (i) captured image data of many hands (including hands having various shapes, such as the first and the open hand) and (ii) skeleton data of the many hands is used as training data.

In an aspect, the skeleton data presumption section 8*b* may use (i) a right-hand recognition learning model obtained through machine learning in which a set of captured image data of the right hand and skeleton data of the right hand is used as training data and (ii) a left-hand recognition learning model obtained through machine learning in which a set of captured image data of the left hand and skeleton data of the left hand is used as training data to recognize, in accordance with from which of the right-hand recognition learning model and the left-hand recognition learning model the skeleton data has been successfully obtained, whether the hand of the operator is the right hand or the left hand.

Figure 6:
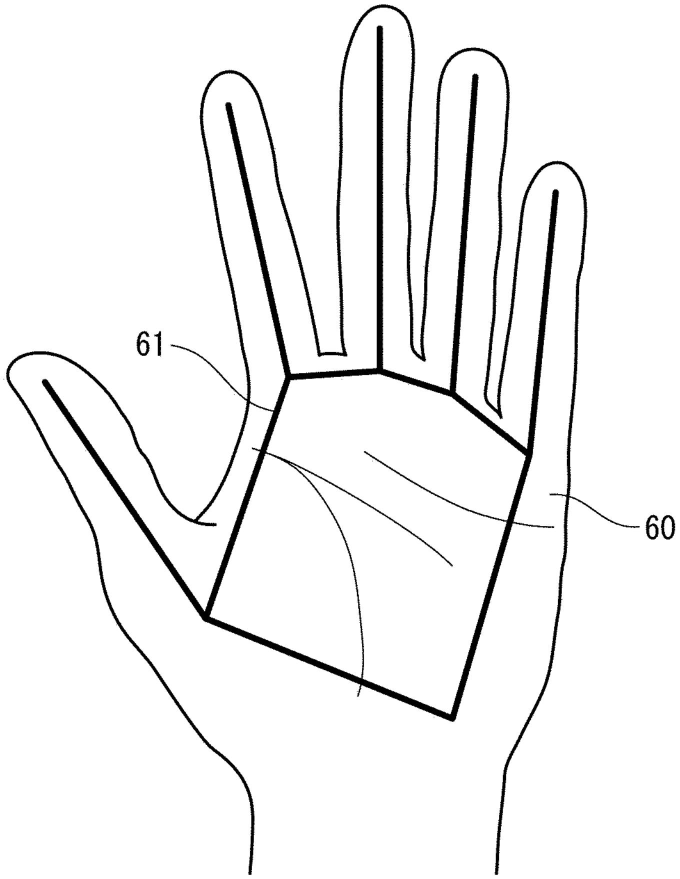
FIG. 6 shows an example of a view schematically illustrating a state in which a skeleton is superimposed on image data of a hand.

FIG. 5 shows an example of a view schematically illustrating a state in which a skeleton 51 that is indicated by the skeleton data having been determined by the skeleton data presumption section 8*b* is superimposed on image data of a hand 50 which is the fist. However, the superimposed skeleton 51 is schematically added, and it is only necessary that the skeleton data be determined in the control section 2. FIG. 6 shows an example of a view schematically illustrating a state in which a skeleton 61 that is indicated by the skeleton data having been determined by the skeleton data presumption section 8*b* is superimposed on image data of a hand 60 which is open.

In a case where the presumption section 8 thus presumes the skeleton data, the control section 2 can acquire, from the hand of the operator, various values. Examples of the various values include a value(s) of a position(s) of the palm and/or finger(s) of the operator on a plane and values of three-dimensional depths of the position(s) of the finger(s) and the position of the palm. This makes it possible to, for example, acquire data that is equivalent to data which is acquired in a case where the operator wears a glove-type sensor on the hand. This allows the determination section 9 to determine the cursor position or detect the gesture (action), so that the electronic device 1 or the application that is executed by the electronic device 1 can be operated.

Determination of Cursor Position in Accordance with Skeleton Data Etc.

The following description will discuss, with reference to FIGS. 7 to 10, a flow of, for example, determination of the cursor position in accordance with the skeleton data in Embodiment 1.

Figure 7:
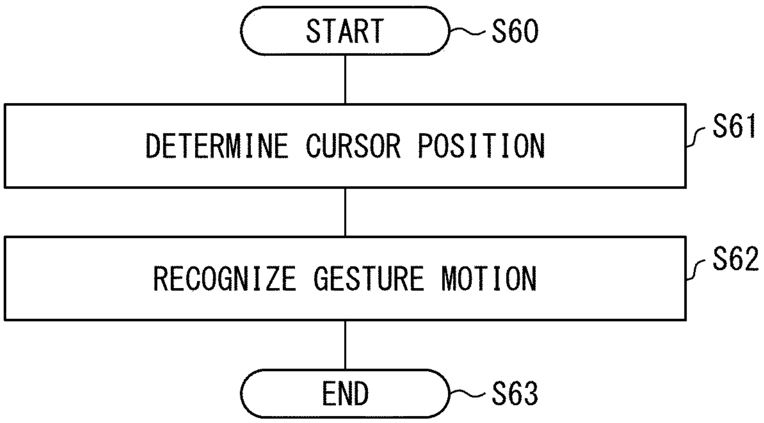
FIG. 7 is a flowchart describing an example of a flow of, for example, determination of a cursor position in accordance with the skeleton data in Embodiment 1.

FIG. 7 is a flowchart describing an example of a flow of, for example, determination of the cursor position in accordance with the skeleton data in Embodiment 1. When the process is started (a step S60), the determination section 9 may determine the cursor position in accordance with the skeleton data having been presumed by the presumption section 8 (a step S61).

The determination section 9 may calculate a position of a specific part of the hand of the operator in accordance with the skeleton data and determine the cursor position so that the cursor position corresponds to the position. For example, the determination section 9 may calculate a position of a base of a specific finger of the hand of the operator and determine the cursor position so that the cursor position corresponds to the position of the base of the specific finger. For example, the determination section 9 may determine, as the cursor position, a position obtained by adding together (i) a position of the region having been extracted by the region extraction section 8*a* and containing the hand, the position being located in the captured image data, and (ii) a position of a specific part of the hand of the operator, the position being calculated in accordance with the skeleton data and located in the hand as a whole.

Figure 8:
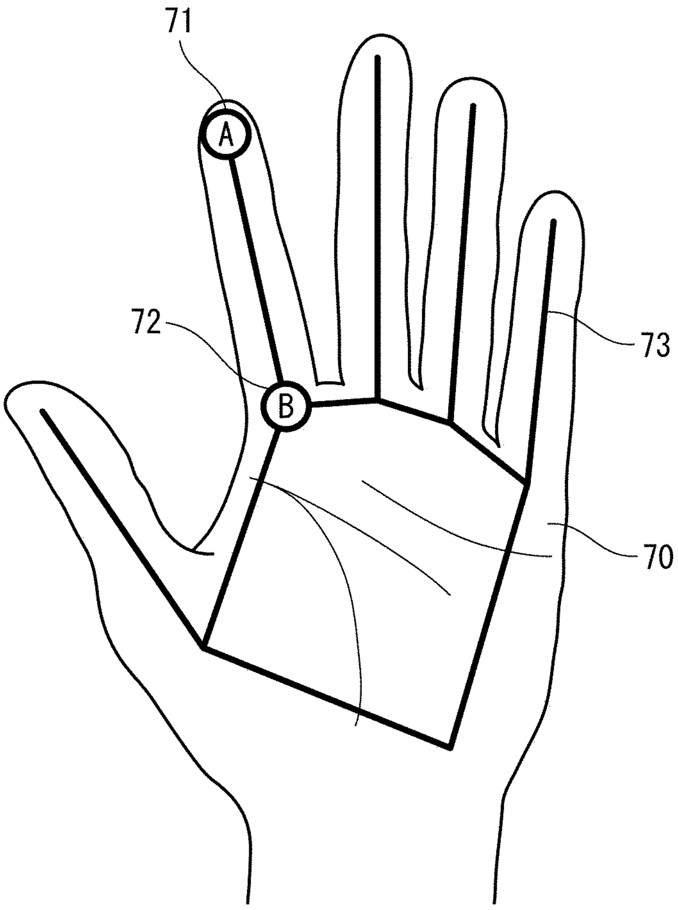
FIG. 8 is an example of a view schematically illustrating a state in which a skeleton is superimposed on image data of a hand.

FIG. 8 is an example of a view schematically illustrating a state in which a skeleton is superimposed on image data of a hand 70 of the operator. In an example, the determination section 9 may specify, in accordance with skeleton data 73, a point 72 indicative of a base B of an index finger and determine the cursor position so that the cursor position corresponds to a position of the specified point 72.

Subsequently, the determination section (detection section) 9 may detect a gesture (action for operating the electronic device 1) in accordance with the skeleton data 73 having been presumed by the presumption section 8 (a step S62). The gesture (action) detected by the determination section 9 is not particularly limited, and the determination section 9 may detect various gestures (actions), e.g., gestures (actions) such as a click action, a swipe action, and a drag-and-drop action.

In an aspect, different gestures may be assigned to respective forms of a skeleton model. In an aspect, a form of the skeleton model is represented by (i) a specific parameter defined in the skeleton data 73 and (ii) a condition satisfied by the specific parameter. For example, in a case where the specific parameter defined in the skeleton data 73 satisfies a specific condition, the determination section 9 may detect a gesture corresponding to the specific parameter and the specific condition.

The specific parameter is exemplified by but not limited to the following:

- a relative distance between a plurality of predetermined points in the skeleton data 73;
- an angle formed by the plurality of predetermined points in the skeleton data 73;
- a shape formed by the plurality of predetermined points in the skeleton data 73; and
- a moving speed of one or more predetermined points in the skeleton data 73.

The specific condition is exemplified by but not limited to the following:

- whether the relative distance is not more than a predetermined threshold;
- whether the relative distance is within a predetermined range;
- whether the angle is not more than a predetermined threshold;
- whether the angle is within a predetermined range;
- the shape is a predetermined shape (e.g., whether a shape formed by five fingers is a “paper” shape or a “rock” shape);
- whether the moving speed is not more than a predetermined threshold;
- whether the moving speed is within a predetermined range; and
- whether a state in which any of the above conditions is satisfied has continued for a period not less than a threshold.

The specific condition may be a combination of a plurality of conditions concerning a parameter. A predetermined point (described earlier) may be any point in the skeleton data 73, and may be, for example, any position of any finger, any position of the palm, or any position of the fist. Note that a gesture to be assigned may be changed depending on whether the hand is the right hand or the left hand.

In an aspect, the determination section 9 may determine the gesture with reference to Table 1 as shown below. Table 1 shows an assigned gesture for each combination of a parameter and a condition. Note that the parameter may be one (1) parameter or two or more parameters. A single gesture may be assigned to a plurality of combinations.

TABLE 1

| Parameter | Condition | Gesture |
|---|---|---|
| Relative distance between fingertip A of index finger and base B of index finger Time of action | The relative distance became shorter than or equal to X and then became longer than or equal to Y in less than a predetermined time | Click action |
| Position of fingertip A of index finger Relative distance between fingertip A of index finger and base B of index finger Time of action | The position was moved during a predetermined time period or longer after the relative distance had become shorter than or equal to X, and then the relative distance became longer than or equal to Y | Swipe action |
| Position of fingertip A of index finger Relative distance between fingertip A of index finger and base B of index finger Time of action | A predetermined time period or longer was spent, after the relative distance had become shorter than or equal to X, to determine a target object, then the position was moved, and the relative distance became longer than or equal to Y at the final position | Drag-and-drop action |
| . . . | . . . | . . . |

The following description will more specifically discuss a process in which the determination section 9 detects the gesture.

The determination section 9 may detect the gesture in accordance with the relative distance between the plurality of predetermined points in the skeleton data 73. For example, in the hand 70 illustrated in FIG. 8, the determination section 9 may specify, in accordance with the skeleton data 73, not only the point 72 indicative of the base B of the index finger but also a point 71 indicative of a fingertip A of the index finger, and detect the click action in accordance with a positional relationship between the point 71 and the point 72. Note that the term "fingertip" does not necessarily mean only a tip part of a finger and need not be the tip part provided that the fingertip is a movable part of the finger.

For example, in the skeleton data 73, a point corresponding to a first joint of the index finger may be regarded as the point 71, and the point indicative of the base B of the index finger may be regarded as the point 72. Alternatively, a point corresponding to a tip of the index finger may be regarded as the point 71, and a point corresponding to a tip of a thumb may be regarded as the point 72. In the skeleton data 73, the gesture may be detected in accordance with a positional relationship among the following three points: the point corresponding to the tip of the index finger; a point corresponding to a tip of a middle finger; and the point corresponding to the tip of the thumb. Every possible point in the skeleton data 73 thus can be used as a point for use in detection of the gesture.

Figure 9:
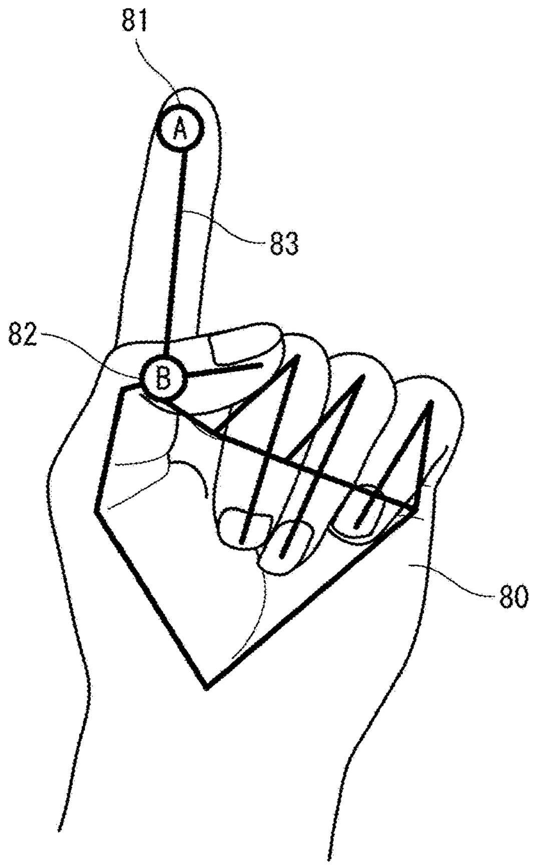
FIG. 9 is an example of a view schematically illustrating a state in which a skeleton is superimposed on image data of a hand.
Figure 10:
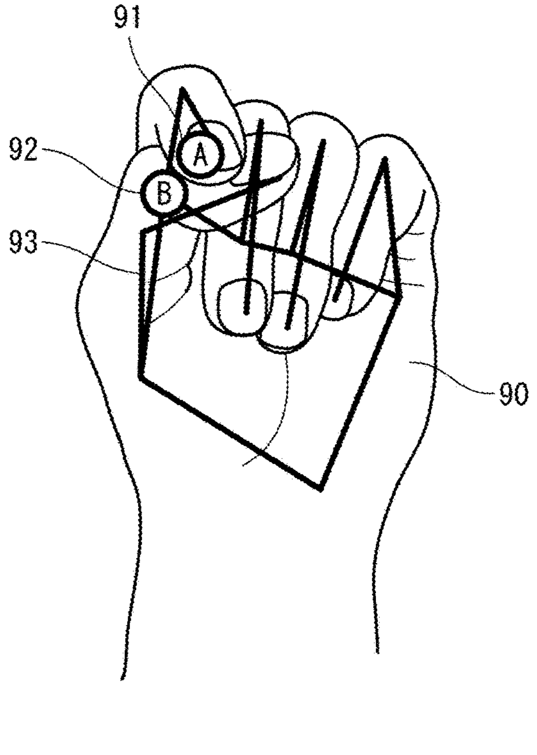
FIG. 10 is an example of a view schematically illustrating a state in which a skeleton is superimposed on image data of a hand.

In an example, the operator may carry out the click action by (i) forming a shape of the hand as in a hand 80 illustrated in FIG. 9, then (ii) forming a shape of the hand as in a hand 90 illustrated in FIG. 10, and (iii) restoring again the shape of the hand of (ii) to the shape of the hand of (i) as in the hand 80 illustrated in FIG. 9.

In this case, for the hand 80, the determination section 9 may specify, in accordance with skeleton data 83, a point 81 indicative of the fingertip A of the index finger and a point 82 indicative of the base B of the index finger. For the hand 90, the determination section 9 may specify, in accordance with skeleton data 93, a point 91 indicative of the fingertip A of the index finger and a point 92 indicative of the base B of the index finger.

Meanwhile, since a root 82 of the index finger, the root 82 having been set in a step S63, is covered with the thumb, the root 82 need not be recognizable from an image of the hand of the operator. Note, however, that the root 82 of the index finger, the root 82 being covered with the thumb, may be recognizable because a skeleton and/or a virtual globe model are/is recognized as information on the hand 80 of the operator by recognition of the hand of the operator as illustrated in FIG. 3. A position A of a fingertip 81 of the index finger in FIG. 9, the fingertip 81 having been set in the step S62, and a position B of the root 82 of the index finger, the root 82 having been set in the step S63, may be positionally apart from each other as in a state where the hand 80 of the operator is opened.

The above description has explained that the fingertip 81 of the index finger, the fingertip 81 having been set in the step S62, can be recognized from an image of the hand of the operator, the image having been acquired from the camera 4, and that the root 82 of the index finger, the root 82 having been set in the step S63, need not be recognizable from an image of the hand of the operator, the image having been acquired from the camera 4. Note, however, that both (a) the fingertip 81 of the index finger, the fingertip 81 having been set in the step S62, and (b) the root 82 of the index finger, the root 82 having been set in the step S63, may be unrecognizable from an image of the hand of the operator, the image having been acquired from the camera 4. This may be because the skeleton and/or the virtual globe model are/is recognized as the information on the hand 80 of the operator as described earlier by recognition of the hand of the operator as illustrated in FIG. 3.

The determination section 9 which (i) detects that a distance between the point 91 and the point 92 in the hand 90 has become narrower than a distance between the point 81 and the point 82 in the hand 80 and then (ii) detects that the distance between the point 91 and the point 92 in the hand 90 has been widened to the distance between the point 81 and the point 82 in the hand 80 may determine that the click action has been carried out.

Note that a hand movement to which the click action is assigned is not particularly limited, and the click action can be assigned to any motion that can be carried out by one hand. For example, the determination section 9 which detects that the index finger and the middle finger, both of which were in a stretched state, have been brought into contact and separated may determine that the click action has been carried out. The determination section 9 may determine, in accordance with, for example, whether points at a tip, a base, and each joint of each of the index finger and the middle finger are arranged in a straight line, whether the index finger and the middle finger are in a stretched state. Fingers to be subjected to the determination are not limited to the index finger and the middle finger.

The determination section 9 thus can detect the gesture in accordance with a positional relationship between a point at a fingertip of a specific finger and a point at a base of the specific finger. Specifically, for example, the determination section 9 can detect the click action in accordance with a positional relationship between a point at the fingertip of the index finger and a point at the base of the index finger. According to this, since a finger base part that serves as a supporting point of motion less moves, the present invention in accordance with an embodiment makes it easy to detect the gesture. That is, the present invention in accordance with an embodiment makes it possible to improve stability of operation.

For example, by causing the shape of the hand to indicate a start of the gesture, moving the hand, and then causing the shape of the hand to indicate an end of the gesture, the operator can carry out the gesture that specifies a movement, such as the swipe action or the drag-and-drop action. For example, the operator may carry out the swipe action by (i) forming the shape of the hand as in the hand 80 illustrated in FIG. 9, then (ii) forming the shape of the hand as in the hand 90 illustrated in FIG. 10, (iii) moving the fingertip, and thereafter (iv) restoring again the shape of the hand of (ii) to the shape of the hand of (i) as in the hand 80 illustrated in FIG. 9.

In this case, the determination section 9 which (i) detects that the distance between the point 91 and the point 92 in the hand 90 has become narrower than the distance between the point 81 and the point 82 in the hand 80, then (ii) detects that the point 91 has been moved, and thereafter (iii) detects that the distance between the point 91 and the point 92 in the hand 90 has been widened to the distance between the point 81 and the point 82 in the hand 80 may determine that the swipe action has been carried out.

Note that the hand 90 of the operator in FIG. 10 has a very complicated hand shape because fingers except the index finger are in a clenched (bent) state and the fingers are in the bent state with the index finger superimposed thereon. In particular, the base of the index finger is hidden by the other fingers. For such a hand 90 of the operator, the determination section 9 can also detect, in accordance with the skeleton data, each point including the base of the index finger.

Operation of Electronic Device or Application

Figure 11:
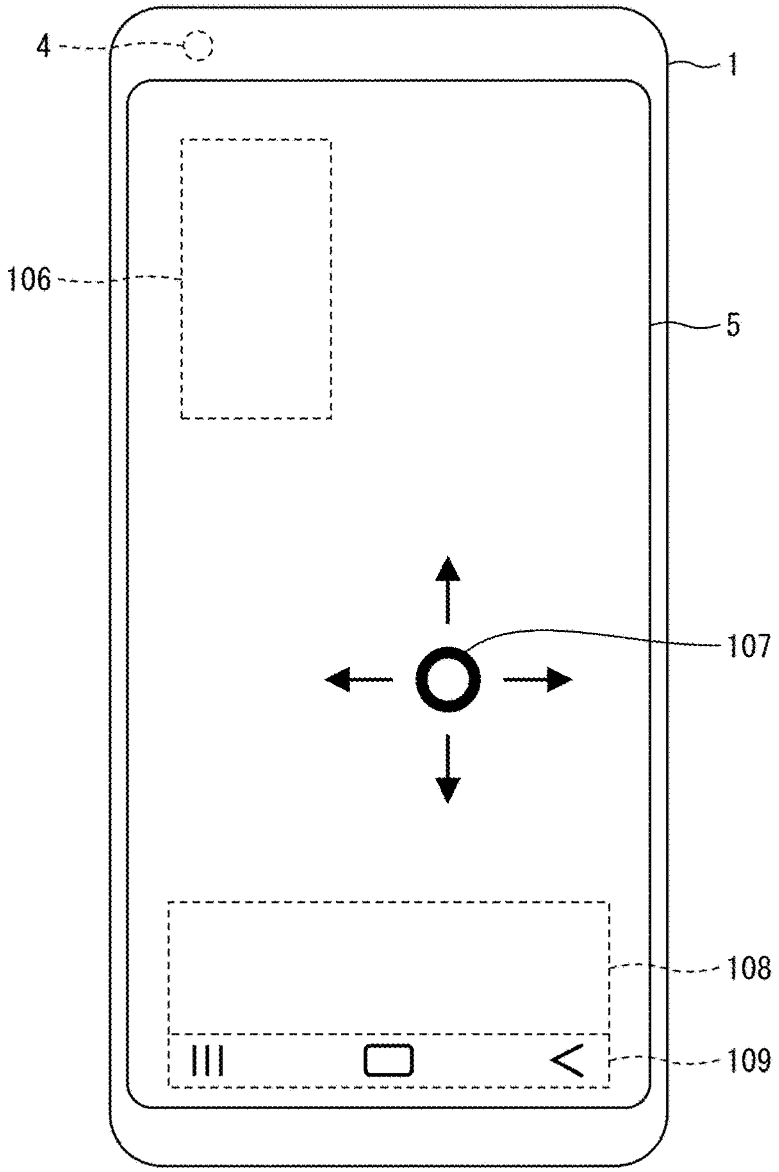
FIG. 11 is an external view for describing an example of operation of the electronic device in Embodiment 1.

FIG. 11 is an external view for describing an example of operation of the electronic device 1. The electronic device 1 may be specifically a smartphone. The electronic device 1 may include a camera 104 and a display section 105.

For example, the acquisition section 3 may set a monitor region 106 in the display section 105 and cause the monitor region 106 to display a captured image captured by the camera 104. The monitor region 106 displays the operator's hand whose image is captured by the camera 104. Note, however, that in order not to hide a screen to be operated, the image may be displayed at, for example, an upper left corner on the screen. Note also that the monitor region 106 need not be provided.

For example, the operation section (cursor display section) 10 may display a cursor 107 at a position in the display section (display screen) 105, the position corresponding to the cursor position having been determined by the determination section 9. That is, the cursor 107 may move up and down and left and right in accordance with a hand movement of the operator in a range whose image is captured by the camera 104.

For example, the operation section 10 may cause an icon region 108 of the display section 105 to display an icon for executing an application that can be executed by the electronic device 1. In a case where the determination section 9 detects the click action while the cursor 107 is superimposed on the icon in the icon region 108, the operation section 10 may execute an application corresponding to the icon.

Furthermore, during the execution of the application, in a case where the determination section 9 moves the cursor position and in a case where the determination section 9 detects the action, the operation section 10 may operate the application in accordance with the movement of the cursor position and the detected action.

A shape and a color of the cursor 107 that is displayed in the display section 105 by the operation section 10 are not particularly limited. However, in an example, the operation section 10 may display the cursor 107 in a display manner corresponding to the action having been detected by the determination section 9. For example, the operation section 10 may change the color of the determination section 107 as follows: the operation section 10 displays the cursor 107 in blue in a case where the determination section 9 does not detect any action; the operation section 10 displays the cursor 107 in green in a case where the determination section 9 detects the click action and the swipe action; and the operation section 10 displays the cursor 107 in red in a case where the determination section 9 detects the drag-and-drop action.

Figure 12:
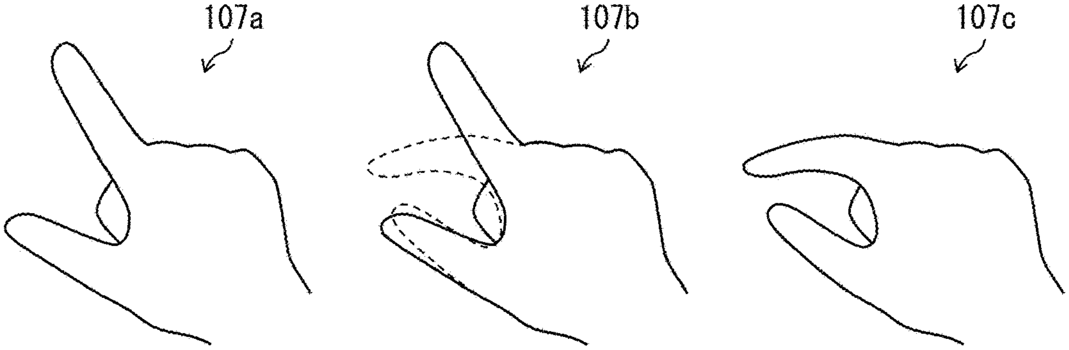
FIG. 12 is a view showing an example of a change in cursor shape.

The operation section 10 may change the shape of the cursor in accordance with the action having been detected by the determination section 9. FIG. 12 is a view showing an example of a change in cursor shape. For example, the operation section 10 may change the shape of the cursor as follows: the operation section 10 displays a cursor 107*a* in a case where the determination section 9 does not detect any action; the operation section 10 displays an animation such as a cursor 107*b* in a case where the determination section 9 detects the click action; and the operation section 10 displays a cursor 107*c* in a case where the determination section 9 detects the swipe action.

The display section 105 may be partially a system region (specific region) 109. The system region 109 is a region in which UIs (e.g., a home button, a backward button, and an option button) for system operation are displayed and whose display cannot be changed by the operation section 10.

Figure 13:
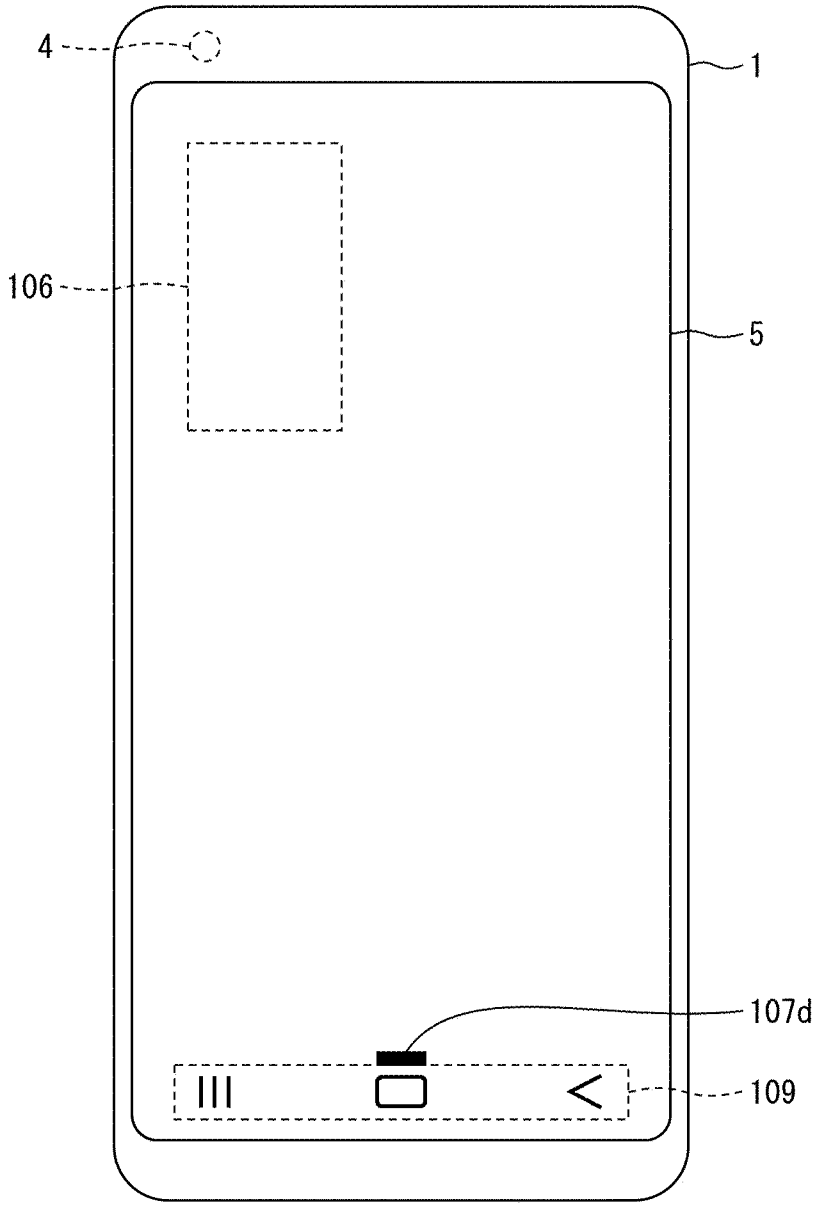
FIG. 13 is an external view for describing an example of operation of the electronic device in Embodiment 1.

FIG. 13 is an external view showing an example of the display section 105 in a case where the cursor position having been determined by the determination section 9 is in the system region 109. As described earlier, in a case where the cursor position having been determined by the determination section 9 is in the system region 109, the operation section 10 cannot display the cursor position in the system region 109. In this case, for example, the operation section 10 may display a cursor 107*d* outside the system region 109 in a display manner different from the display manner in which the cursor 107 that is displayed in a case where the cursor position is outside the system region 109 is displayed. The cursor 107*d* may differ from the cursor 107 in shape and/or in color. In a case where the determination section 9 detects the click action in this state, the operation section 10 may carry out a process that is carried out in a case where the click action is carried out at the cursor position in the system region 109. This also enables successful operation of the UIs for system operation.

As has been discussed above, by moving the hand and/or performing a gesture by the hand in an image capture range of the camera 104 of the electronic device 1, the operator can operate the electronic device 1 as in the case of a pointing device without any contact with the electronic device 1.

Embodiment 2

Example Configuration

The following description will discuss an example configuration of Embodiment 2 with reference to the drawings. A configuration of an electronic device in accordance with Embodiment 2 is identical to the configuration of Embodiment 1 shown in FIG. 1, unless otherwise described, and a description thereof will therefore be omitted by referring to the description of Embodiment 1.

Figure 14:
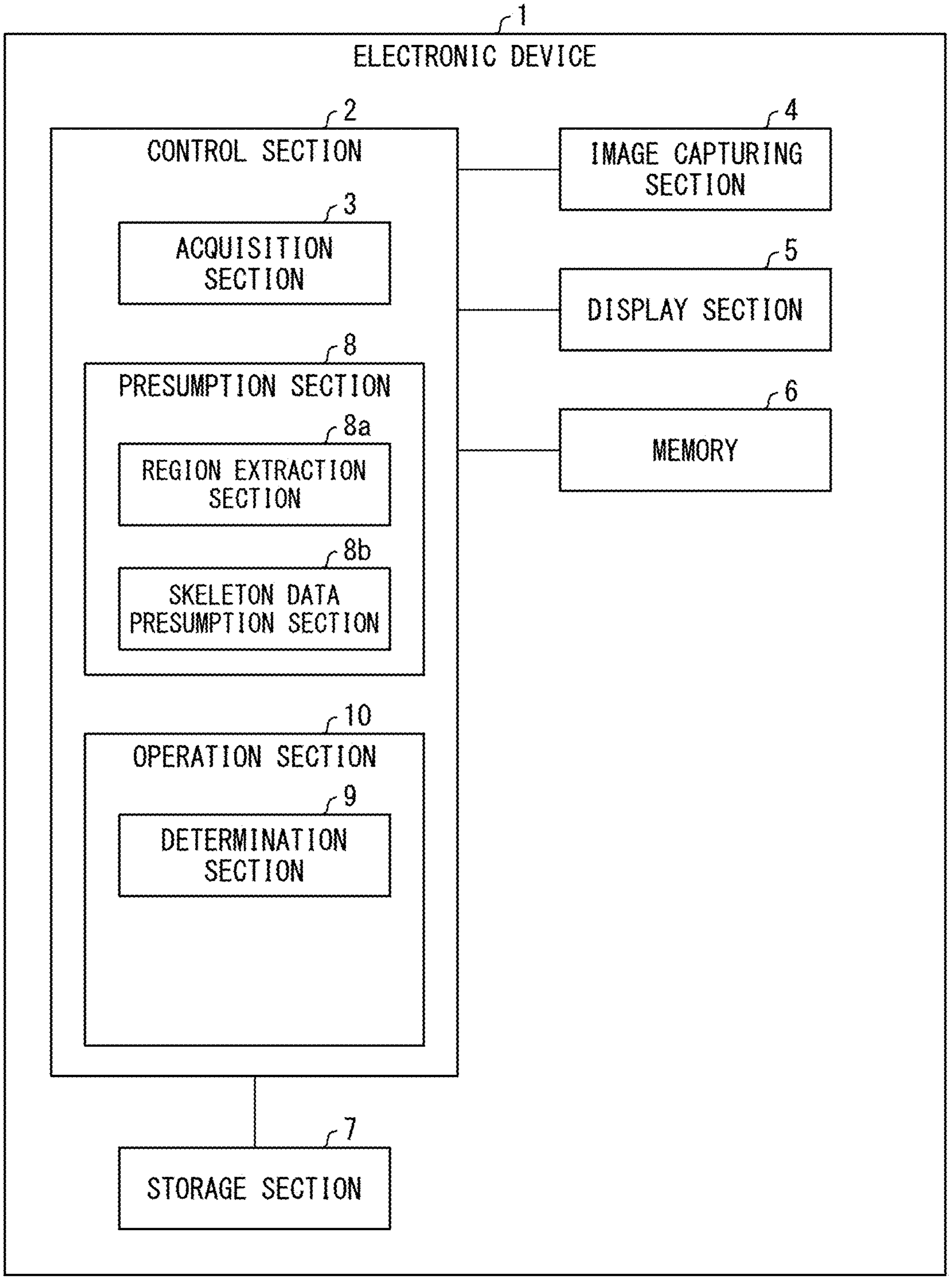
FIG. 14 is a block diagram showing an example of a configuration of an electronic device in accordance with Embodiment 2.

FIG. 14 is a block diagram showing an example of a configuration of an electronic device 1 in accordance with Embodiment 2. Embodiment 2 differs from Embodiment 1 in that an operation section 10 includes a determination section 9. That is, in Embodiment 2, the operation section 10 may operate, in accordance with skeleton data 73 having been presumed by a presumption section 8, an application that is executed by the electronic device 1.

Note that the determination section 9 does not necessarily need to determine a cursor position, and may detect only a gesture in accordance with the skeleton data 73. The operation section 10 and the determination section 9 may operate the application in accordance with the gesture. This makes it possible to operate an application whose operation does not require the cursor position.

Embodiment 3

Example Configuration

The following description will discuss an example configuration of Embodiment 3 with reference to the drawings. A configuration of an electronic device in accordance with Embodiment 3 is identical to the configuration of Embodiment 1 shown in FIG. 1, unless otherwise described, and a description thereof will therefore be omitted by referring to the description of Embodiment 1.

Figure 15:
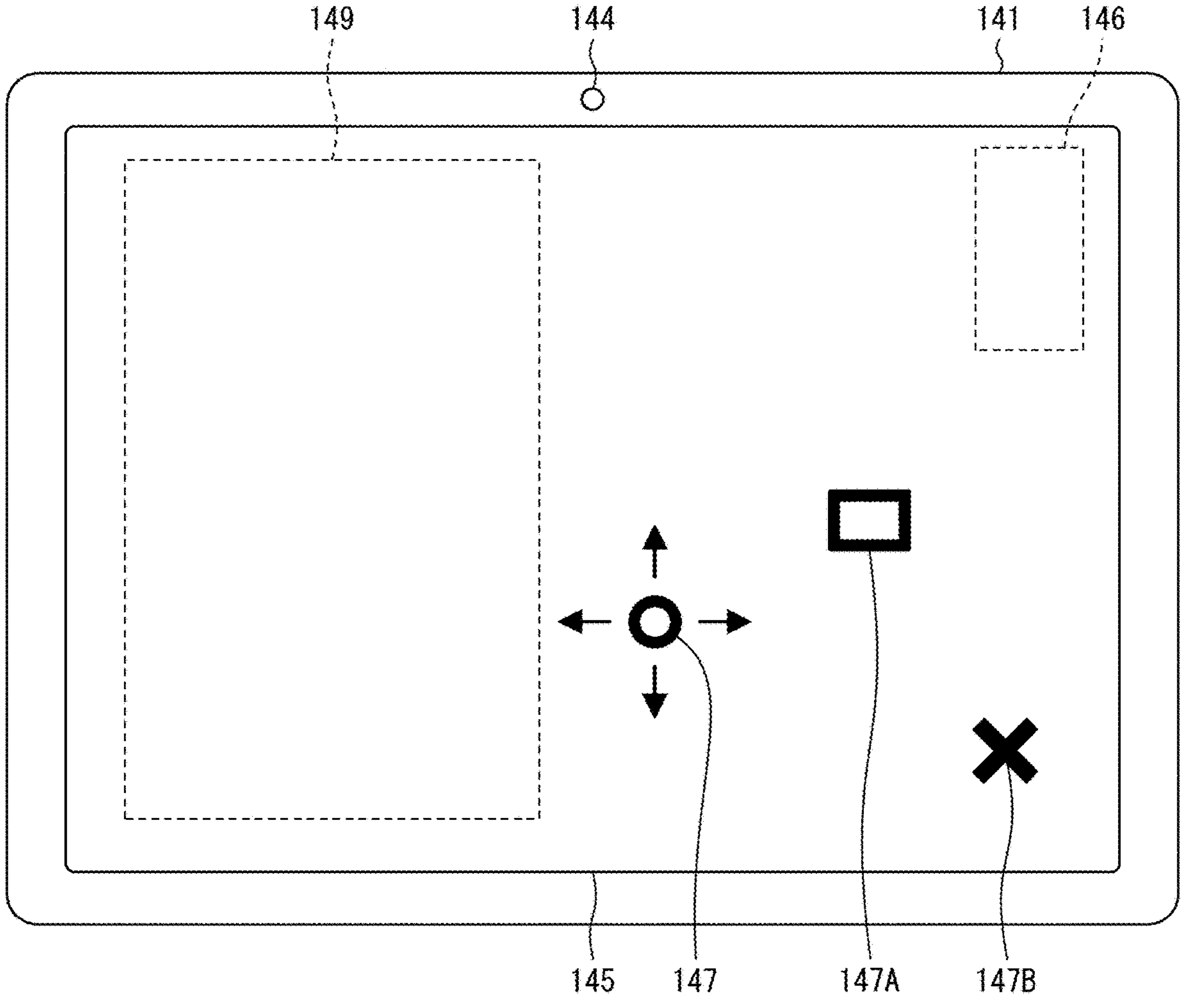
FIG. 15 is an external view for describing an example of operation of an electronic device in Embodiment 3.

FIG. 15 is an external view of an electronic device 141 for describing operation of an electronic device by a gesture performed by both hands. The following description will discuss, as an example, a case where the electronic device 141 is a tablet terminal. Note, however, that Embodiment 3 is not limited to this and can be applied to an electronic device in general. The electronic device 141 may include a camera 144 and a display section 145. The display section 145 may be provided with a monitor region 146 and an icon region 149. An operation section 10 may cause the display section 145 to display a cursor 147.

In this case, a determination section 9 may detect a gesture (action) performed by both hands of an operator. For example, the determination section 9 may detect a first special action in a case where the operator makes an L-shape by an index finger and a thumb of each hand and makes a rectangle by combining tips of the respective index fingers of both hands and tips of the respective thumbs of the both hands. In a case where the determination section 9 detects the first special action, the operation section 10 may change a shape of the cursor to a rectangular cursor 147A and cause a display section 105 to display a property of an item that is placed and displayed below the cursor 147A.

For example, the determination section 9 may also detect a second special action in a case where the operator makes an X-mark by stretching index fingers of both hands straight and crossing the index fingers in their respective central parts. In a case where the determination section 9 detects the second special action, the operation section 10 may change the shape of the cursor to a cursor 147B of the X-mark and move, to a recycle bin, an item that is placed and displayed below the cursor 147B.

The determination section 9 may alternatively detect all of (i) a gesture performed by the left hand of the operator, (ii) a gesture performed by the right hand of the operator, and (iii) a gesture performed by both hands of the operator. This makes it possible to use all gestures that can be made by human hands to operate the electronic device 141. By extracting, in accordance with a first or palm having been detected in captured image data, a region containing a hand corresponding to the first or palm, a region extraction section 8*a* can simultaneously detect a plurality of regions each containing the hand.

As has been discussed above, by moving the hand and/or performing a gesture by the hand in an image capture range of a camera 104 of the electronic device 141, the operator can operate the electronic device 141 without any contact with the electronic device 141.

Embodiment 4

Example Configuration

The following description will discuss an example configuration of Embodiment 4 with reference to the drawings. A configuration of an electronic device in accordance with Embodiment 4 is identical to the configuration of Embodiment 1 shown in FIG. 1, unless otherwise described, and a description thereof will therefore be omitted by referring to the description of Embodiment 1.

Figure 16:
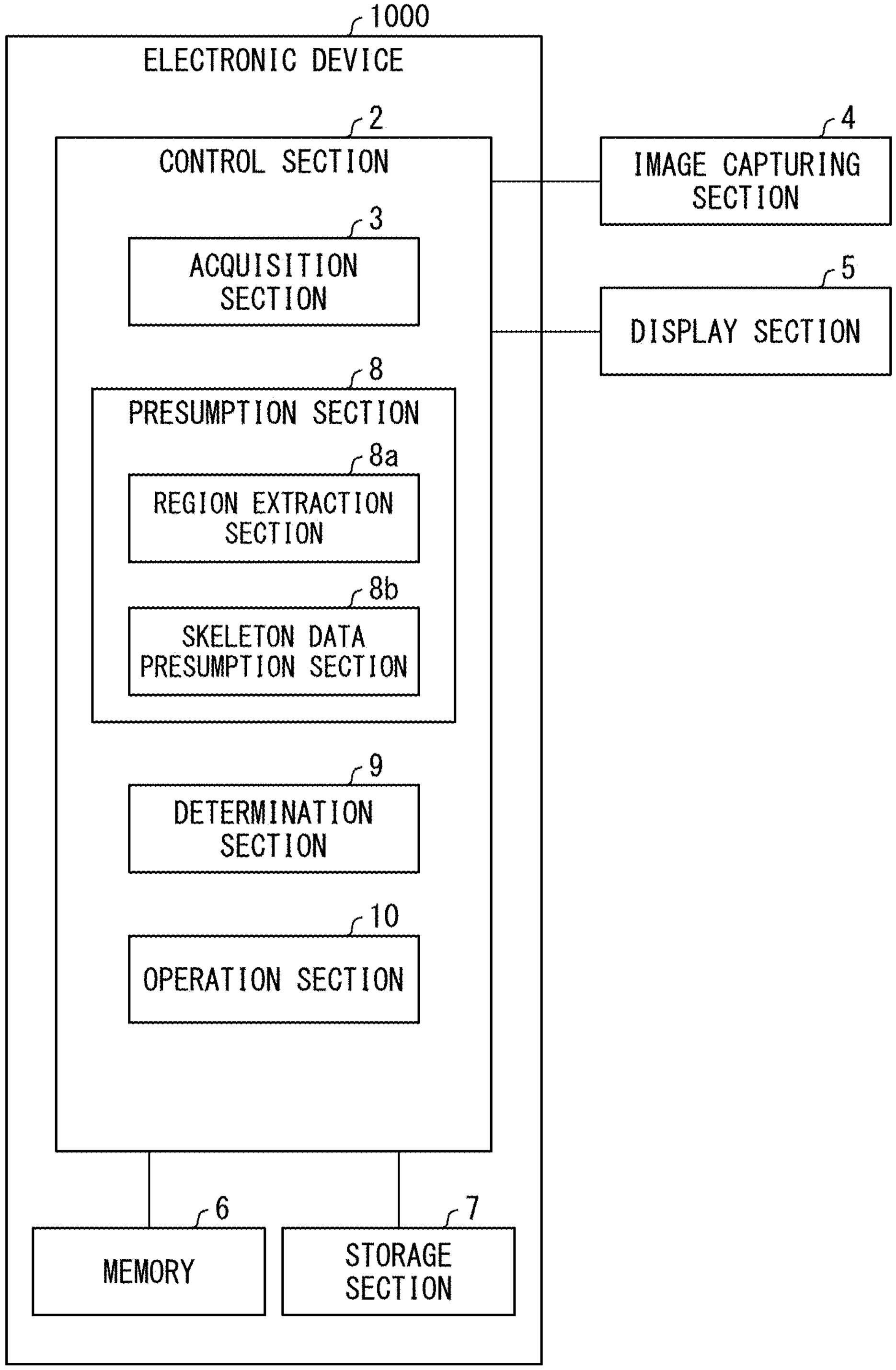
FIG. 16 is a block diagram showing an example of a configuration of an electronic device in accordance with Embodiment 4.

FIG. 16 is a block diagram showing an example of a configuration of an electronic device 1000 in accordance with Embodiment 4. The electronic device 1000 includes no image capturing section 4 and no display section 5, and is connected to an external image capturing section 4 and a display section 5. The electronic device thus does not necessarily need to include an image capturing section 4 and a display section 5, and may be configured such that at least one of the image capturing section 4 and the display section 5 is externally present.

Figure 17:
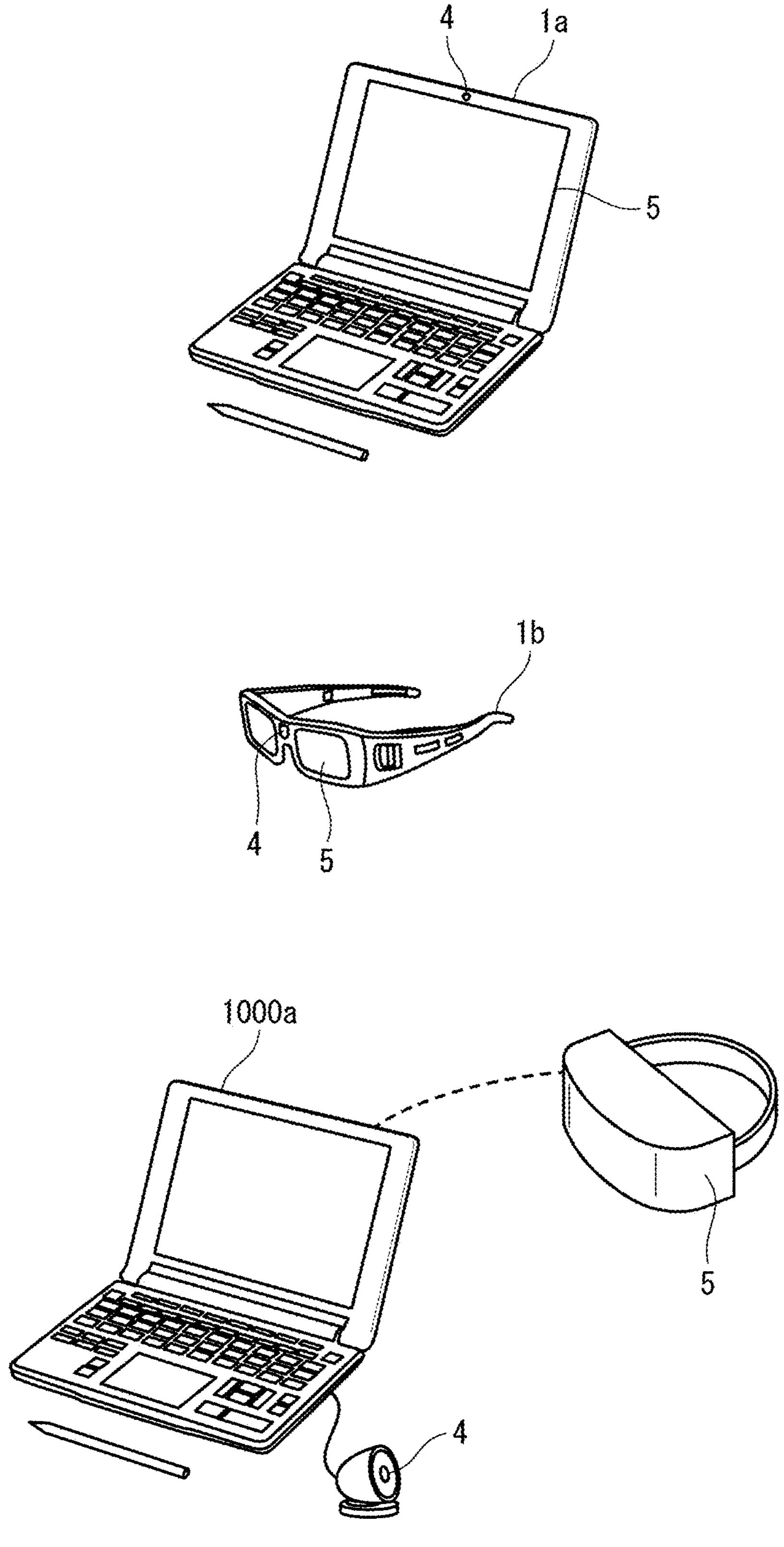
FIG. 17 is a view illustrating appearances of several specific example configurations of the electronic device in Embodiment 4.

The embodiments each can be applied to various electronic devices. FIG. 17 is a view illustrating appearances of several specific example configurations of the electronic device of Embodiment 4. An electronic device 1*a* is a laptop computer and may include a camera (image capturing section 4) and a display (display section 5). An electronic device 1*b* is a smart eyewear and may include the camera (image capturing section 4) and the display or a retina projection section (display section 5). An external head mount display (display section 5) and the camera (image capturing section 4) may be connected in a wireless or wired manner to an electronic device 1000*a*.

Variation

In recognizing a hand, in order to recognize the hand with higher accuracy, it is possible to register a target object as an exclusion target in a recognition algorithm in advance, the target object being a target object whose image has been captured by a camera and that is not related to the hand, e.g., a target object that is different from the hand, such as a human face and/or clothes, and that relatively easily appears unexpectedly in a photograph.

In addition, in recognizing the hand, a position of the hand whose image is to be captured is not particularly mentioned. However, the hand that is located too close to the camera will extend off its captured image. In contrast, the hand that is located too far from the camera causes its captured image to be small. This results in a reduction in accuracy with which to recognize the hand. Thus, by setting, with respect to the camera, a range of a position of the hand whose image is to be captured, it is possible to recognize the hand with higher accuracy.

The above description has explained that operation of an electronic device by a hand gesture may be carried out first in a mode in which a hand of an operator is recognized. In order to make it easier to understand whether the electronic device supports the mode in which the hand of the operator is thus recognized, it is possible to display an icon at, for example, a lower right of a display section of the electronic device. The icon may have a shape that is exemplified by but not limited to a human shape.

In operation of the electronic device by a hand gesture, motions that are a cursor movement and a click have been taken up as examples of Embodiment 1. However, a "long tap" function is frequently set in many smartphone models. Thus, by adding a gesture corresponding to the long tap, the long tap function can also be supported by a gesture.

Software Implementation Example

Part or all of functions of the electronic devices 1, 141, and 1000 may be realized by hardware of an integrated circuit (IC chip) or the like or may be alternatively realized by software.

Figure 18:
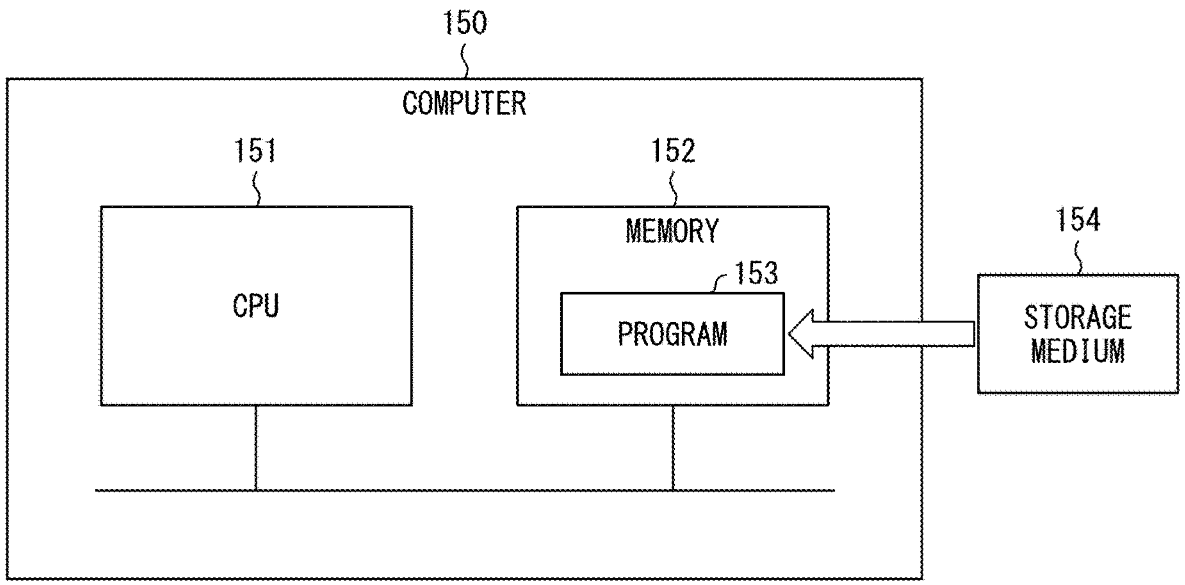
FIG. 18 is an example of a block diagram of a computer.

In the latter case, the electronic devices 1, 141, and 1000 may be realized by, for example, a computer that executes instructions of a program that is software realizing the foregoing functions. FIG. 18 is an example of a block diagram of a computer. A computer 150 may include a central processing unit (CPU) 151 and a memory 152. A program 153 for causing the computer 150 to operate as the electronic devices 1, 141, and 1000 may be stored in the memory 152. Functions of the electronic devices 1, 141 and 1000 may be realized by the CPU 151 reading the program 153 from the memory 152 and executing the program 153.

The CPU 151 may be a graphic processing unit (GPU), a digital signal processor (DSP), a micro processing unit (MPU), a floating point number processing unit (FPU), a physics processing unit (PPU), or a microcontroller. Examples of the memory 152 include a random access memory (RAM), a read only memory (ROM), a flash memory, a hard disk drive (HHD), a solid state drive (SSD), and a combination thereof.

The computer 150 may further include a communication interface for transmitting and receiving data with other device(s). The computer 150 may further include an input/output interface for connecting input/output devices such as a keyboard, a mouse, a display, and a printer.

The program 153 may be stored in a non-transitory tangible storage medium 154 that can be read by the computer 150. Examples of the storage medium 154 include a tape, a disk, a card, a semiconductor memory, and a programmable logic circuit. The computer 150 may read the program 153 from the storage medium 154. The computer 150 may read the program 153 via a transmission medium. Examples of the transmission medium include a communication network and a broadcast wave. Part or all of functions of the electronic devices 1, 141, and 1000 may be realized by hardware of an integrated circuit (IC chip) or the like or may be alternatively realized by software.

According to the electronic devices having the configurations described earlier, it is possible to operate an electronic device without any contact with the electronic device. This makes it possible to reduce the possibility of viral infection. This makes it possible to achieve "GOOD HEALTH AND WELL-BEING", which is Goal 3 of Sustainable Development Goals (SDGs).

Additional Remarks

The invention disclosed herein may also be partially described as in the additional notes below, but is not limited to the following.

Additional Note 1

An electronic device including:

- an acquisition section configured to acquire captured image data of a hand of an operator;
- a presumption section configured to presume, in accordance with the captured image data, skeleton data corresponding to the hand; and
- a determination section configured to determine, in accordance with the skeleton data, a cursor position for operating the electronic device.

Additional Note 2

An electronic device including:

- an acquisition section configured to acquire captured image data of a hand of an operator;
- a presumption section configured to presume, in accordance with the captured image data, skeleton data corresponding to the hand; and
- an operation section configured to operate, in accordance with the skeleton data, an application that is executed by the electronic device.

Additional Note 3

A program for causing at least one processor of an electronic device to carry out:

- an acquisition process for acquiring captured image data of a hand of an operator;
- a presumption process for presuming, in accordance with the captured image data, skeleton data corresponding to the hand; and
- a determination process for determining, in accordance with the skeleton data, a cursor position for operating the electronic device.

Additional Note 4

A program for causing at least one processor of an electronic device to carry out:

- an acquisition process for acquiring captured image data of a hand of an operator;
- a presumption process for presuming, in accordance with the captured image data, skeleton data corresponding to the hand; and
- an operation process for operating, in accordance with the skeleton data, an application that is executed by the electronic device.

The present invention is not limited to the embodiments, but can be altered by a skilled person in the art within the scope of the claims. The present invention also encompasses, in its technical scope, any embodiment derived by combining technical means disclosed in differing embodiments. It is possible to form a new technical feature by combining the technical means disclosed in the respective embodiments.

REFERENCE SIGNS LIST

1, 141, 1000 Electronic device
2 Control section
3 Acquisition section
4 Image capturing section
5, 145 Display section
6 Memory
7 Storage section
8 Presumption section
**8*a*** Region extraction section
**8*b*** Skeleton data presumption section
9 Determination section
10 Operation section
40 first
41 Region containing hand

50, 60, 70, 80, 90 Hand
51, 61, 73, 83, 93 Skeleton
71, 81, 91 Point at fingertip
72, 82, 92 Point at base of finger
106, 146 Monitor region
107, 107*a*, 107*b*, 107*c*, 107*d*, 147, 147A, 147B Cursor
108, 149 Icon region
109 System region
150 Computer
151 CPU
152 Memory
153 Program
154 Storage medium

The invention claimed is:

1. An electronic device comprising at least one processor configured to carry out:

acquiring captured image data of a hand of an operator;

presuming, in accordance with the captured image data, skeleton data corresponding to the hand; and determining, in accordance with the skeleton data, a cursor position for operating the electronic device, wherein presuming skeleton data corresponding to the hand comprises: detecting only a first or a palm in the captured image data so as to extract a region containing a hand, wherein the first or the palm is detected using a learning model in which a set of (i) image data of the first or the palm and (ii) a region of the hand corresponding to the first or the palm is learned as training data, the first or the palm being part of the hand; and then presuming the skeleton data from the region containing the hand.

2. The electronic device of claim 1, wherein determining the cursor position for operating the electronic device comprises determining the cursor position in accordance with a position of a specific part of the hand, the position being indicated by the skeleton data.

3. The electronic device of claim 1, wherein the at least one processor is configured to further carry out detecting, in accordance with the skeleton data, an action for operating the electronic device.

4. The electronic device of claim 3, wherein detecting the action for operating the electronic device comprises detecting a click action in accordance with a positional relationship between a tip of a finger and a base of the finger, the positional relationship being indicated by the skeleton data.

5. The electronic device of claim 3, wherein the at least one processor is configured to further carry out displaying, on a display screen of the electronic device, a cursor in accordance with the cursor position having been determined.

6. The electronic device of claim 5, wherein the displaying the cursor in accordance with the cursor position having been determined comprises displaying the cursor in a display manner corresponding to the action having been detected.

7. The electronic device of claim 5, wherein the display screen contains a specific region, and displaying the cursor in accordance with the cursor position having been determined comprises displaying, in a case where the cursor position having been determined is in the specific region, the cursor in an outside region outside the specific region in a display manner different from a display manner in a case where the cursor position is in the outside region.

8. The electronic device of claim 1, wherein presuming skeleton data corresponding to the hand further comprises presuming the skeleton data with use of learning model obtained through machine learning in which a set of the captured image data of the hand and the corresponding skeleton data is used as training data.

9. The electronic device of claim 8, wherein presuming skeleton data corresponding to the hand further comprises using a right-hand recognition learning model obtained through machine learning in which a set of captured image data of a right hand and corresponding skeleton data is used as training data and a left-hand recognition learning model obtained through machine learning in which a set of captured image data of a left hand and corresponding skeleton data is used as training data, to recognize whether the hand of the operator is the right hand or the left hand, in accordance with which of the right-hand recognition learning model and the left-hand recognition learning model the skeleton data has been successfully acquired from.

10. The electronic device of claim 1, wherein the captured image data is an RGB image acquired with a single camera.

11. An electronic device comprising at least one processor configured to carry out:

acquiring captured image data of a hand of an operator;

presuming, in accordance with the captured image data, skeleton data corresponding to the hand; and operating, in accordance with the skeleton data, an application that is executed by the electronic device, wherein presuming skeleton data corresponding to the hand comprises: detecting only a first or a palm in the captured image data so as to extract a region containing a hand, wherein the first or the palm is detected using a learning model in which a set of (i) image data of the first or the palm and (ii) a region of the hand corresponding to the first or the palm is learned as training data, the first or the palm being part of the hand; and then presuming the skeleton data from the region containing the hand.

12. A non-transitory tangible storage medium that stores a program for causing at least one processor of an electronic device to carry out:

an acquisition process for acquiring captured image data of a hand of an operator;

a presumption process detecting only a first or a palm in the captured image data so as to extract a region containing the hand, wherein the first or the palm is detected using a learning model in which a set of (i) image data of the first or the palm and (ii) a region of the hand corresponding to the first or the palm is learned as training data, the first or the palm being part of the hand and then presuming skeleton data from the region containing the hand; and an operation process for operating, in accordance with the skeleton data, an application that is executed by the electronic device.

* * * * *